(12) United States Patent
Patel et al.

(10) Patent No.: US 8,174,222 B2
(45) Date of Patent: May 8, 2012

(54) METHODS, SYSTEMS AND APPARATUS FOR DYNAMICALLY CONTROLLING AN ELECTRIC MOTOR THAT DRIVES AN OIL PUMP

(75) Inventors: Nitinkumar R. Patel, Cypress, CA (US); Yo Chan Son, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 393 days.

(21) Appl. No.: 12/577,516

(22) Filed: Oct. 12, 2009

(65) Prior Publication Data

US 2011/0084638 A1    Apr. 14, 2011

(51) Int. Cl.
| | |
|---|---|
| H02P 6/00 | (2006.01) |
| H02P 21/00 | (2006.01) |
| H02P 7/00 | (2006.01) |
| H02P 23/00 | (2006.01) |
| H02P 27/04 | (2006.01) |
| G05B 11/28 | (2006.01) |
| B60K 1/02 | (2006.01) |
| F16H 59/00 | (2006.01) |
| F04C 18/00 | (2006.01) |

(52) U.S. Cl. ......... 318/400.32; 318/400.01; 318/400.02; 318/599; 318/727; 318/799; 318/492; 318/802; 318/807; 318/811; 477/3; 477/98; 418/206.1

(58) Field of Classification Search ............ 318/400.01, 318/400.02, 400.32, 492, 599, 727, 799, 318/802, 807, 811; 477/3, 98; 418/206.1
See application file for complete search history.

(56) References Cited

U.S. PATENT DOCUMENTS

| | | | |
|---|---|---|---|
| 5,729,113 A * | 3/1998 | Jansen et al. | 318/799 |
| 6,913,558 B2 * | 7/2005 | Mori et al. | 477/3 |
| 7,223,205 B2 * | 5/2007 | Etchason et al. | 477/98 |
| 7,625,312 B2 * | 12/2009 | Ido | 477/98 |
| 2004/0070362 A1 | 4/2004 | Patel et al. | |
| 2007/0009372 A1 * | 1/2007 | Wockel et al. | 418/206.1 |
| 2008/0129237 A1 * | 6/2008 | Atarashi et al. | 318/492 |
| 2009/0140676 A1 | 6/2009 | Son et al. | |

OTHER PUBLICATIONS

Yeh, C-C., et al. "Electric Motor Stator Winding Temperature Estimation," U.S. Appl. No. 12/568,002, filed Sep. 28, 2009.

* cited by examiner

*Primary Examiner* — Walter Benson
*Assistant Examiner* — Gabriel Agared
(74) *Attorney, Agent, or Firm* — Ingrassia Fisher & Lorenz, P.C.

(57) ABSTRACT

Methods, system and apparatus are provided for sensorless control of a vector controlled motor drive system that includes an electric motor used to drive an auxiliary oil pump.

20 Claims, 5 Drawing Sheets

METHODS, SYSTEMS AND APPARATUS FOR DYNAMICALLY CONTROLLING AN ELECTRIC MOTOR THAT DRIVES AN OIL PUMP

TECHNICAL FIELD

The present invention generally relates to hybrid and electric vehicle power systems, and more particularly relates to techniques for enhancing motor control of an auxiliary oil pump to provide dynamic performance over a wide range of oil temperatures.

BACKGROUND OF THE INVENTION

Hybrid and electric vehicles (HEVs) typically include an electric traction drive system that includes an alternating current (AC) electric motor which is driven by a power converter with a direct current (DC) power source, such as a storage battery. Motor windings of the AC electric motor can be coupled to inverter sub-modules of a power inverter module (PIM). Each inverter sub-module includes a pair of switches that switch in a complementary manner to perform a rapid switching function to convert the DC power to AC power. This AC power drives the AC electric motor, which in turn drives a shaft of HEV's drivetrain. Traditional HEVs implement multiple three-phase pulse width modulated (PWM) inverter modules and multiple three-phase AC machines (e.g., AC motors) each being driven by a corresponding one of the three-phase PWM inverter modules that it is coupled to.

Vector Control

Many modern high performance AC motor drives use the principle of field oriented control (FOC) or "vector" control to control operation of the AC electric motor. In particular, vector control is often used in variable frequency drives to control the torque applied to the shaft (and thus finally the speed) of a three-phase AC electric motor by controlling the current fed to the three-phase AC electric motor. In short, stator phase currents are measured and converted into a corresponding complex space vector. This current vector is then transformed to a coordinate system rotating with the rotor of the three-phase AC electric motor. This technique requires knowledge of the rotor's angular position (i.e., the mechanical rotational angular position of rotor relative to the "stator" or motor windings).

Sensor-Based Control

Many vector controlled motor drive systems employ a rotor speed or position sensor, and a motor winding temperature sensor attached to the motor to control and protect the motor. For example, the rotor's angular position can be computed based on actual measured quantities using some type of speed or position sensor for control feedback measurement. For instance, to determine the angular position of the rotor, its angular speed can be measured with a speed sensor, and the angular position can then be obtained by integrating the speed measurements. Other systems may use a resolver and resolver-to-digital converter circuit which provides absolute position information directly. A speed or position sensor is an expensive component. These sensors typically increase the cost and reliability of the motor drive system due to the fact that extra sensor components and additional wiring are required. Moreover, the circuitry required to process its signals can also be expensive. These sensors can also have reliability and maintenance issues. The presence of the speed/position sensor in the system adds cost, size, and weight, and reduces reliability as well. As such, it would be desirable to eliminate these sensors. It would be desirable to eliminate this speed/position sensor and replace the measured quantities by computed estimates. It would also be desirable to eliminate mechanical interface hardware, reduce cost and weight, and improve the reliability of an electric traction drive system.

Sensorless Control

To eliminate the rotor position sensor, the rotor's angular position can also be estimated without actually using a sensor to measure actual speed/position quantities. Numerous methods for estimating the rotor's angular position have been developed The methods can generally be classified as those that work better at low motor operating speeds and those that work better at high motor operating speeds.

In this regard, numerous methods for estimating the rotor's angular position have been developed that are suitable for zero/low speed operation. Examples of sensorless control techniques that work well at low motor operating speeds (or zero speed) have been proposed, in United States Patent Application Publication Number US 2004/0070362 entitled "POSITION SENSORLESS CONTROL ALGORITHM FOR AC MACHINE," filed Oct. 10, 2002, which is incorporated by reference herein in its entirety. The sensorless control technique described in US 2004/0070362 employs a high-frequency signal-injection method. In the high-frequency signal-injection method, a pulse width modulated (PWM) inverter injects a balanced high-frequency test signal based on the estimated rotor position, such as a voltage (or current) signal, on a stator winding of the motor. The resultant effect of the balanced high frequency test signal on stator current (or voltage) can be measured at the same position. The effect of the balanced high frequency test signal injection can be observed in a measured stator current which contains the position error information between the real and the estimated rotor position. This effect is due to the spatial modulation of the magnetic saliency as the rotor rotates. The current signal is detected at the corresponding frequency, and demodulated to reconstruct the rotor position and speed by using the low-pass filters and position/speed estimator.

At high motor operating speeds, where the back electro-magnetic-motive-force (EMF) voltage is sufficiently high, a sensorless control technique that employs a math-based flux observer can be used. One such example is described in United States Patent Application Publication Number US 2009/0140676-A1 entitled "METHOD AND SYSTEM FOR SENSORLESS CONTROL OF AN ELECTRIC MOTOR," filed Nov. 29, 2007, which is incorporated by reference herein in its entirety.

One approach that can be used to cover the entire range of motor operating speeds (i.e., rotor angular velocities) is to selectively enable/disable two different sensorless control techniques depending on the motor speed. For example, at high motor operating speeds, a sensorless control technique that employs a math-based flux observer, such as that shown in United States Patent Application Publication Number US 2009/0140676-A1 can be enabled. At low motor operating speeds (or zero speed), a sensorless control technique that employs a signal-injection method, such as that described in United States Patent Application Publication Number US 2004/0070362, can be enabled.

Conventional and hybrid electric vehicles have an oil pump that generates oil pressure needed to drive numerous actuators, such as clutches, pedals and many other hydraulic loads. It would be desirable to drive the oil pump with an electric permanent magnet (PM) motor that is common in such vehicles. It would be highly desirable to do so using a vector controlled motor drive system that implements sensorless control techniques described above in the background section to thereby eliminate the need for expensive position/speed sensors or motor temperature sensors. Although it would be desirable to use a PM motor and vector controlled motor drive system that uses sensorless control techniques to drive an oil pump, there are a number of considerations that make this quite challenging.

In comparison to other types of vector controlled motor drive systems (e.g., where the electric motor drives a vehicle drive shaft as opposed to where the electric motor drives an oil pump transmission), the oil pump transmission typically has a very small inertia, which makes it a highly dynamic mechanical system. In other words, the mechanical time constant ($\tau$) is very small. The time constant determines the bandwidth of the system. Sensorless control techniques require high estimation bandwidth to track such fast mechanical movement.

Because viscosity of oil changes significantly with respect to the temperature, the load characteristics of the oil pump tend to vary significantly depending on temperature of the oil being pumped. For example, when the oil being pumped gets cold, its viscosity increases (e.g., becomes slushy) and the load dynamics of the motor become relatively slow in comparison to when the oil is at a higher temperature. This makes the rotor of the motor rotate more slowly with the same torque used at higher temperature. At high temperatures, however, the oil becomes thin, and the load dynamics become relatively fast. Thus, when the oil is cold, a much higher static torque will be required for the motor than in comparison to a higher temperature case, and in such a case, high bandwidth of a position and speed estimator in the United States Patent Application Publication Number US 2004/0070362 and US 2009/0140676-A1 will just amplify the noise even though the actual system moves slowly. By contrast, when the oil is hot, the oil pump driven by the electric motor has to be robust to this load variations, which becomes an issue for sensorless control.

Moreover, most oil pump control systems can use a speed controller. The speed controller is driven by a speed command, and the higher level controller controls pressure and flow of the oil being pumped in response to the speed command. However, when the speed command changes too abruptly, it will create the sudden back pressure which makes the motor stop momentarily, or may even spin the motor backward for a short time. When the actual motor speed changes too fast, this can induce control instability in sensorless control techniques that have finite bandwidth to estimate the rotor's position and angular velocity.

Dynamic performance of the sensorless control techniques described in the published applications mentioned above can be somewhat limited. For example, at higher bandwidths and motor speeds, a rotor position and speed estimator can track/estimate the position and speed of the rotor relatively well, but can exhibit control instability due to the noise. At lower bandwidths and motor speeds, when the motor delivers high torque, control stability is generally better since the rotor position and speed estimator can filter out unwanted noise (e.g., induced by the analog circuits). Nevertheless, the system may exhibit control instability when dynamic variation of the load changes too rapidly.

Accordingly, it would be desirable to enhance or improve conventional sensorless control techniques, and provide improved methods, systems and apparatus for sensorless control that can be used in a vector controlled motor drive system that includes an electric motor used to drive an auxiliary oil pump. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Embodiments of the present invention relate to methods, systems and apparatus for sensorless control that can be used in a vector controlled motor drive system that includes an electric motor used to drive an auxiliary oil pump.

A motor drive system is provided that includes an oil pump, a pulse width modulated (PWM) inverter module designed to receive switching vector signals and designed to generate three-phase voltage signals, an electric motor designed to drive the oil pump, a motor current measurement module, a transmission control module, and a controller that generates switching vector signals that drive the PWM inverter module. The electric motor comprises motor windings each being coupled to the PWM inverter module to receive the three-phase voltage signals that drive a rotor of the electric motor at varying angular velocities. The electric motor generates three-phase stator currents at the motor windings. The motor current measurement module measures the three-phase stator currents. The transmission control module generates a measured oil temperature.

In one embodiment, the controller includes a motor temperature estimator module, a position and speed estimator module, a low-pass filter that generates a filtered rotor angular velocity signal, a speed controller module that generates a motor torque command signal based on a modified motor speed command signal and a filtered rotor angular velocity signal, and a current regulated vector control module.

The motor temperature estimator module receives the measured oil temperature and the measured three-phase stator currents, and generates an estimated motor temperature. The position and speed estimator module generates an estimated rotor angular position output. The current regulated vector control module generates the switching vector signals based on the motor torque command signal, the three-phase stator currents measured from the electric motor, the filtered rotor angular velocity signal, the estimated motor temperature and the estimated rotor angular position output.

In another embodiment, the controller further includes a sensorless estimator module designed to receive the estimated motor temperature and to regularly compute a stator winding resistance value that varies based on the estimated motor temperature. In accordance with another embodiment, the current regulated vector control module comprises a proportional-integral (PI) current controller. Based on the estimated motor temperature, the current regulated vector control module computes a stator winding resistance value (that varies based on the estimated motor temperature) and uses the computed stator winding resistance value to adjust a gain of the PI current controller.

In another embodiment, the position and speed estimator module receives the measured oil temperature and computes an estimated rotor angular position output and an estimated raw rotor angular velocity output based on the rotor angular position error signal. In one implementation, the position and speed estimator module has an open loop transfer function having an open loop gain, and dynamically adjusts the open loop gain based on the measured oil temperature. The open loop gain can used to compute the estimated rotor angular position output and the estimated raw rotor angular velocity output.

In accordance with another embodiment, the low-pass filter has a filter transfer function and is coupled to the position and speed estimator module. The low-pass filter is designed to filter the estimated raw rotor angular velocity output to generate a filtered rotor angular velocity signal that represents absolute estimated rotor angular velocity. The low-pass filter receives the filtered rotor angular velocity signal received via a first feedback loop, and continuously adjusts bandwidth of the low-pass filter based on the absolute estimated rotor angular velocity.

In accordance with another embodiment, the controller further includes a slew rate limiter module that receives a motor speed command input, determines a slew rate of the motor speed command input, and generates a modified motor speed command signal by varying a slew-rate applied to the motor speed command input based on feedback (provided via a second feedback loop) regarding the modified motor speed command signal.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Overview

Before describing in detail embodiments that are in accordance with the present invention, it should be observed that the embodiments reside primarily in combinations of method steps and apparatus components related to controlling an electric motor that is used to drive an oil pump without the use of sensors. It will be appreciated that embodiments of the invention described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the invention described herein may be comprised of one or more conventional processors and unique stored program instructions that control the one or more processors to implement, in conjunction with certain non-processor circuits, some, most, or all of the functions for controlling an electric motor that is used to drive an oil pump without the use of sensors, as described herein. For instance, in one implementation the modules can be implemented as software that runs on a microprocessor or microcomputer. As such, these functions may be interpreted as steps of a method for controlling an electric motor that is used to drive an oil pump without the use of sensors. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the present invention relate to methods and apparatus for controlling an electric motor that is used to drive an oil pump without the use of sensors. The disclosed methods and apparatus can be implemented in operating environments such as a hybrid/electric vehicle (HEV). In the exemplary implementations which will now be described, the control techniques and technologies will be described as applied to a hybrid/electric vehicle (HEV). However, it will be appreciated by those skilled in the art that the same or similar techniques and technologies can be applied in the context of other systems which it is necessary to control an electric motor that is used to drive an oil pump without the use of sensors. In this regard, any of the concepts disclosed here can be applied generally to "vehicles," and as used herein, the term "vehicle" broadly refers to a non-living transport mechanism having an AC motor. Examples of such vehicles include automobiles such as buses, cars, trucks, sport utility vehicles, vans, vehicles that do not travel on land such as mechanical water vehicles including watercraft, hovercraft, sailcraft, boats and ships, mechanical under water vehicles including submarines, mechanical air vehicles including aircraft and spacecraft, mechanical rail vehicles such as trains, trams and trolleys, etc. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

As used herein, the term "AC machine" generally refers to "a device or apparatus that converts electrical energy to mechanical energy or vice versa." AC machines can generally be classified into synchronous AC machines and asynchronous AC machines. Synchronous AC machines can include permanent magnet machines and reluctance machines. Permanent magnet machines include surface mount permanent magnet machines (SMPMMs) and interior permanent magnet machines (IPMMs). Asynchronous AC machines include induction machines. Although an AC machine can be an AC motor (i.e., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC motor is an electric motor that is driven by an alternating current (AC). An AC motor includes an outside stationary stator having coils supplied with alternating current to produce a rotating magnetic field, and an inside rotor attached to the output shaft that is given a torque by the rotating field. Depending on the type of rotor used, AC motors can be classified as synchronous or asynchronous. A synchronous AC motor rotates exactly at the supply frequency or a sub-multiple of the supply frequency. By contrast, an asynchronous (or induction) AC motor turns slightly slower than the supply frequency. The magnetic field on the rotor of this motor is created by an induced current. In implementations where the AC machine is a three-phase permanent magnet synchronous AC motor this should be understood to encompass Interior Permanent Magnet Synchronous Motor (IPMSM), Surface Mount Permanent Magnet Synchronous Motor (SMPMSM) and Reluctance Motors.

Overview

A motor drive system is provided that includes an oil pump, a pulse width modulated (PWM) inverter module designed to receive switching vector signals and designed to generate three-phase voltage signals, an electric motor designed to drive the oil pump, a motor current measurement module, a transmission control module, and a controller that generates switching vector signals that drive the PWM inverter module. The electric motor comprises motor windings each being coupled to the PWM inverter module to receive the three-phase voltage signals that drive a rotor of the electric motor at varying angular velocities. The electric motor generates three-phase stator currents at the motor windings. The motor current measurement module measures the three-phase stator currents. The transmission control module generates a measured oil temperature.

In one embodiment, the controller includes a motor temperature estimator module, a position and speed estimator module, a low-pass filter that generates a filtered rotor angular velocity signal, a speed controller module that generates a motor torque command signal, and a current regulated vector control module. The motor temperature estimator module receives the measured oil temperature and the measured three-phase stator currents, and generates an estimated motor temperature. The position and speed estimator module generates an estimated rotor angular position output. The current regulated vector control module generates the switching vector signals based on the motor torque command signal, the three-phase stator currents measured from the electric motor, the filtered rotor angular velocity signal, the estimated motor temperature and the estimated rotor angular position output.

In another embodiment, the controller further includes a sensorless estimator module designed to receive the estimated motor temperature and to regularly compute a stator winding resistance value that varies based on the estimated motor temperature. The sensorless estimator module generates a rotor angular position error signal that varies based on the stator winding resistance value. For example, the stator winding resistance value can adjusted as a function of the estimated motor temperature. In one implementation, the sensorless estimator module comprises a closed-loop flux observer module having a stator winding resistance value parameter that varies based on the current stator winding resistance value.

In another embodiment, the position and speed estimator module receives the measured oil temperature and computes an estimated rotor angular position output and an estimated raw rotor angular velocity output based on the rotor angular position error signal. In one implementation, the position and speed estimator module has an open loop transfer function having an open loop gain, and dynamically adjusts the open loop gain based on the measured oil temperature. The open loop gain can used to compute the estimated rotor angular position output and the estimated raw rotor angular velocity output. In one implementation, the position and speed estimator module can dynamically adjust the open loop gain by adjusting a zero frequency crossing of the open loop gain based on a position gain scheduling factor that varies in accordance with the measured oil temperature. The zero frequency crossing represents bandwidth of the position and speed estimator module. The zero frequency crossing and bandwidth increases as the measured oil temperature increases, and decreases as the measured oil temperature decreases. In such implementations, the position gain scheduling factor increases as the measured oil temperature increases and decreases as the measured oil temperature decreases. For example, the value of the position gain scheduling factor can be set to a constant value when the measured oil temperature is less than a first temperature set point, can be set to one when the measured oil temperature is greater than a second temperature set point, and linearly increases between the constant value and one when the measured oil temperature increases between the first temperature set point and the second temperature set point. In another implementation, the cutoff frequency and the open loop gain of the position and speed estimator module are decreased as the measured oil temperature decreases while other frequency components the open loop gain remain the same.

In accordance with another embodiment, the low-pass filter has a filter transfer function and is coupled to the position and speed estimator module. The low-pass filter is designed to: filter the estimated raw rotor angular velocity output to generate a filtered rotor angular velocity signal that represents absolute estimated rotor angular velocity. The low-pass filter receives the filtered rotor angular velocity signal received via a first feedback loop, and continuously adjusts bandwidth of the low-pass filter based on the absolute estimated rotor angular velocity. In one implementation, the low-pass filter continuously adjust bandwidth of the low-pass filter by varying a speed gain scheduling factor that varies based on the absolute estimated rotor angular velocity. Adjusting bandwidth of the low-pass filter varies a filtering gain of the filter transfer function. The value of the speed gain scheduling factor can be set to a constant value when the absolute estimated rotor angular velocity is less than a first set point, can be set to one when the absolute estimated rotor angular velocity is greater than a second set point and can be set to a value that linearly increases between the constant value and one when the absolute estimated rotor angular velocity is between the first set point and the second set point.

In another embodiment, the controller further includes a slew rate limiter module that receives a motor speed command input, determines a slew rate of the motor speed command input, and generates a modified motor speed command signal by varying a slew-rate applied to the motor speed command input based on feedback (provided via a second feedback loop) regarding the modified motor speed command signal. In one implementation, the slew rate limiter module can determine a rate of change of the motor speed command input. The slew rate limiter module determines that an acceleration condition is occurring if a current value of the speed command input is greater than a previous value of the speed command input, and determines that a deceleration condition is occurring if the current value of the speed command input is less than the previous value of the speed command input. The slew rate limiter module selects an appropriate one of an acceleration look-up table (LUT) when an acceleration condition is occurring and a deceleration LUT when a deceleration condition is occurring. The acceleration LUT and the deceleration LUT each provide slew rate values as a function of the previous speed command. The slew rate limiter module inputs current actual motor speed into the appropriate one of the LUTs that was selected to generate a particular slew rate value, and modifies a value of its current motor speed command input according to the particular slew rate value to generate its current modified motor speed command signal and limit the rate at which the motor speed command input is changing. For example, when an acceleration condition is occurring and the acceleration LUT is selected, the slew rate limiter module increases the speed command at a particular slew rate value generated by the acceleration LUT. By contrast, when a deceleration condition is occurring and the deceleration LUT is selected, the slew rate limiter module decreases the speed command at a particular slew rate value generated by the deceleration LUT.

In accordance with another embodiment, the speed controller module is designed to generate the motor torque command signal based on the modified motor speed command signal and the filtered rotor angular velocity signal.

In accordance with another embodiment, the current regulated vector control module comprises a proportional-integral (PI) current controller. Based on the estimated motor temperature, the current regulated vector control module computes a stator winding resistance value (that varies based on the estimated motor temperature) and uses the computed stator winding resistance value to adjust a gain of the PI current controller.

One exemplary implementation of the disclosed embodiments will now be described with reference to FIGS. 1-6.

Figure 1:
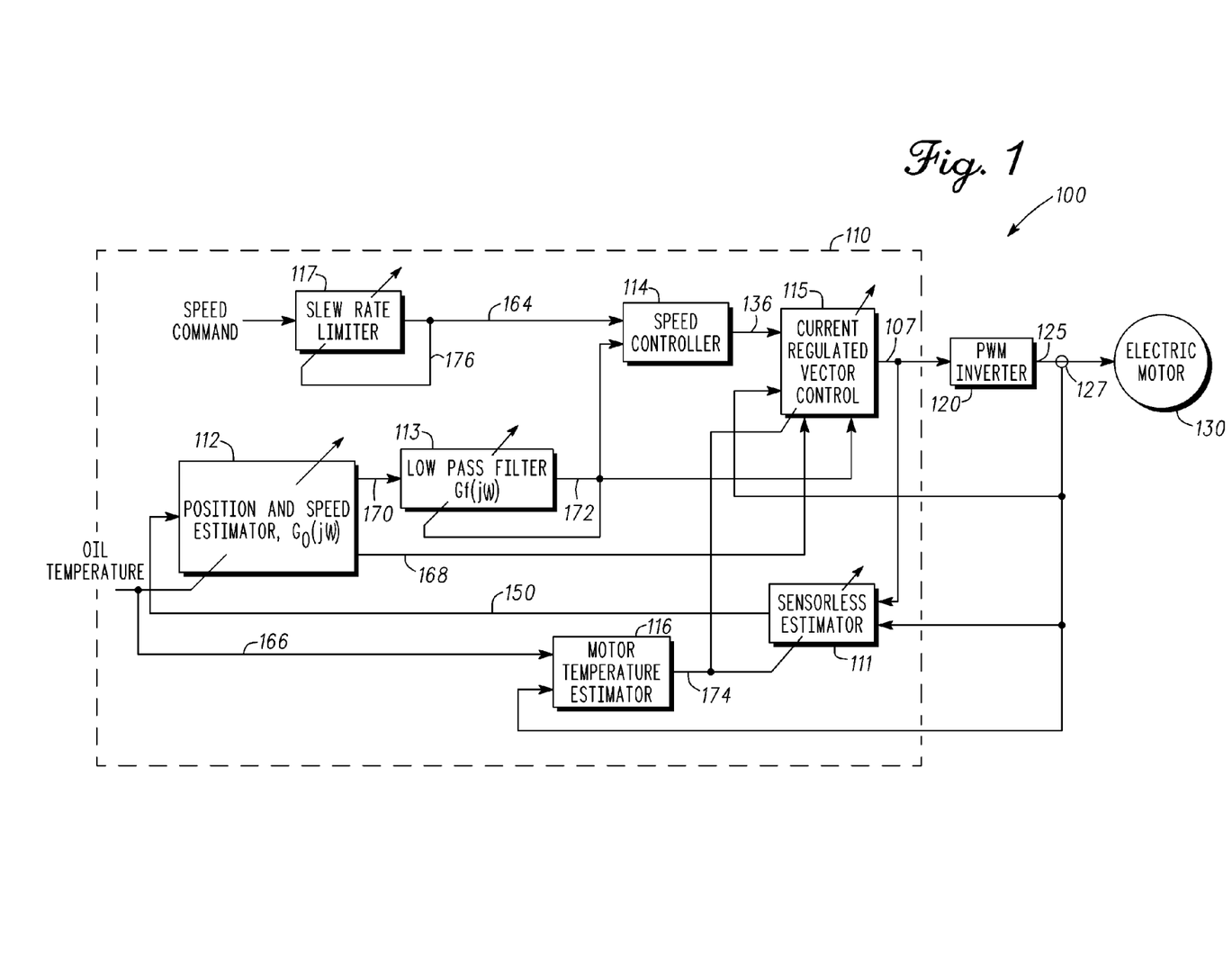
FIG. 1 is a block diagram of a vector controlled motor drive system in accordance with some embodiments of the present invention.

FIG. 1 is a block diagram of a vector controlled motor drive system 100 in accordance with some embodiments of the present invention. The vector controlled motor drive system 100 can be used to control torque in a hybrid/electric vehicle (HEV). In this embodiment, the vector control module 115 of system 100 can be used to control a three-phase AC machine 130 via a three-phase pulse width modulated (PWM) inverter module 120 coupled to the three-phase AC machine 130 so that the three-phase AC machine 130 can efficiently use a DC input voltage (Vdc) (not shown) available from the three-phase PWM inverter module 120 by adjusting voltage commands 125 that control the three-phase AC machine 130. In the following description of one particular non-limiting implementation, the three-phase AC machine 130 is described as a three-phase AC powered motor 130, and in particular a three-phase, permanent magnet synchronous AC powered motor (PMSM) (or more broadly as a motor 130); however, it should be appreciated that the illustrated embodiment is only one non-limiting example of the types of AC machines that the disclosed embodiments can be applied to, and further that the disclosed embodiments can be applied to any type of AC machine.

The motor drive system 100 includes a motor controller 110, a PWM inverter module 120 coupled to the controller 110, a motor current measurement module 127, and an electric motor 130 that drives an oil pump (not shown). The controller 110 comprises a sensorless estimator module 111, a position and speed estimator module 112, a low-pass filter 113, a speed controller module 114, a current regulated vector control module 115, a motor temperature estimator module 116, and a slew rate limiter module 117.

Prior to describing the disclosed embodiments, details of the motor drive system 100 will now be described with reference to FIGS. 1 and 2.

The motor controller 110 generates motor voltage switching commands or "switching vector signals" (Sa, Sb, Sc) 107 that are provided to the PWM inverter module 120.

The PWM inverter module 120 is coupled to the controller 110 and receives switching vector signals (Sa, Sb, Sc) 107 from the controller 110. The switching vector signals 107 control the switching states of switches in PWM inverter 120. In response to the signals 107, the PWM inverter module 120 generates the actual motor voltages based on a DC input voltage ($V_{IN}$) (not shown) and the inputs from controller 110.

The actual motor voltages are provided to motor windings of the electric motor 130 via inverter poles (not illustrated). The actual motor voltages will be referred to below as three-phase voltage command signals 125. The three-phase voltage command signals 125 are alternating current (AC) waveforms.

The motor current measurement module 127 is coupled to the motor windings of the electric motor 130, and is designed to sense and sample three-phase stator currents (Ias, Ibs, Ics) 122-124 between the inverter module 120 and the electric motor 130.

The motor 130 is coupled to the inverter module 120 via three inverter poles such that it receives three-phase voltage signals 125 generated by the PWM inverter module 120. The electric motor 130 uses the three-phase motor voltage command signals 125 to drive a rotor of the electric motor 130 at varying angular velocities, causing the rotor of the motor 130 to generate a commanded torque (Te*) 136 which translates to mechanical output power (Torque X Speed) that is used to drive an oil pump (not shown). Although not illustrated, the system 100 may also include a gear coupled to and driven by the motor 130 shaft. In addition to the rotor, the electric motor 130 includes a stator and motor windings each being coupled to a corresponding one of the inverter poles of the PWM inverter module 120.

Figure 2:
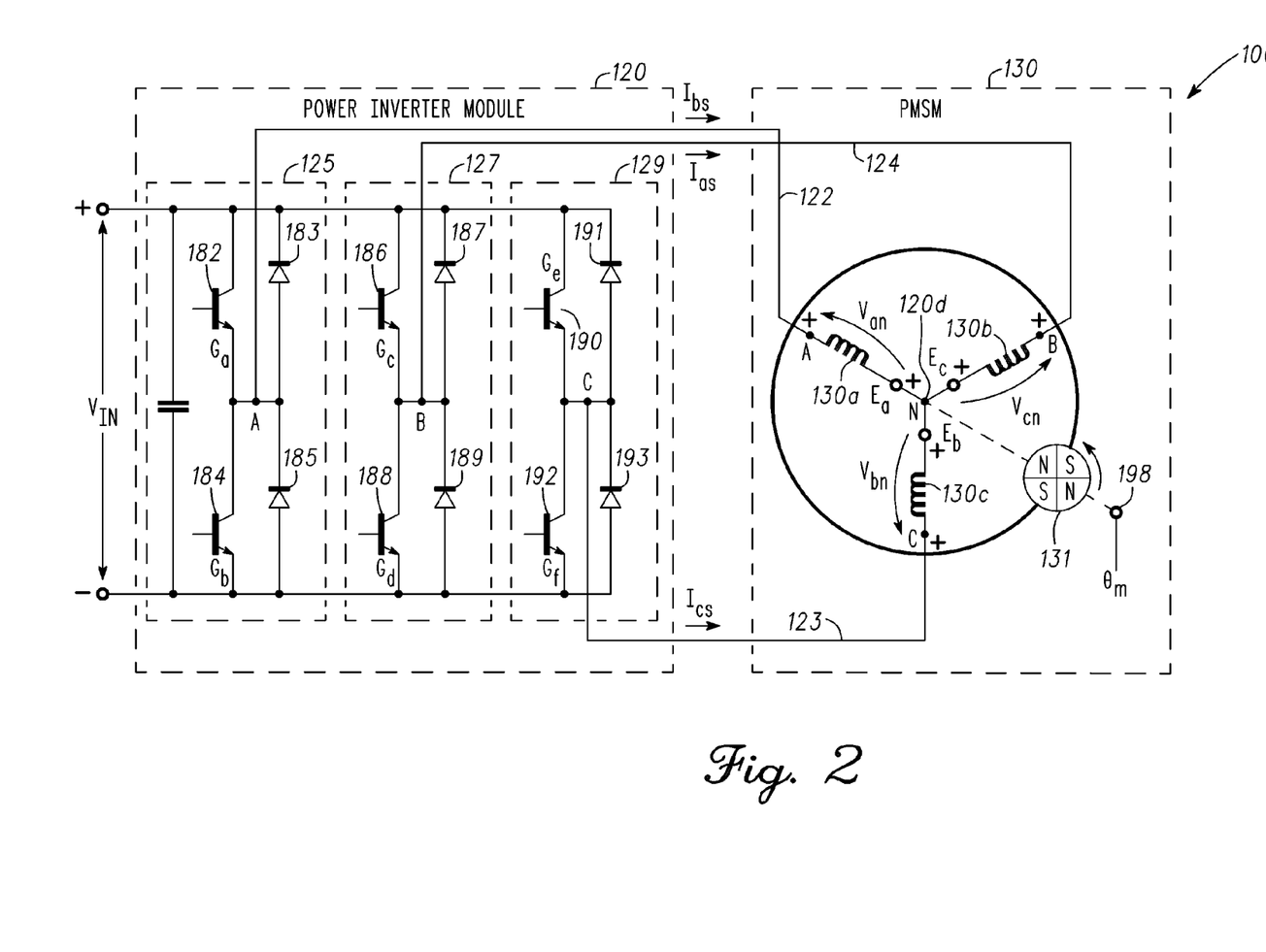
FIG. 2 is a block diagram of a portion of the vector controlled motor drive system of FIG. 1 including further details regarding the three-phase voltage source inverter and the three phase motor.

FIG. 2 is a block diagram of a portion of the vector controlled motor drive system of FIG. 1 including further details regarding the three-phase voltage source inverter 120 and the three phase motor 130. It should be noted that the three-phase voltage source inverter 120 and the three phase motor 130 in FIG. 1 are not limited to this implementation; rather, FIG. 2 is merely one example of how the three-phase voltage source inverter 120 and the three phase motor 130 in FIG. 1 could be implemented in one implementation.

As illustrated in FIG. 2, a particular type of three-phase AC motor 130 that can be referred to as a star-connected (or Y-connected) three-phase electric motor 130, and a three-phase PWM inverter module 120 (that can be referred to as a full-wave bridge inverter 120) are illustrated.

As illustrated in FIG. 2, the three-phase AC motor 130 has three stator or motor windings 130a, 130b, 130c connected in a wye-configuration between motor terminals A, B, and C, and the three-phase PWM inverter module 120 includes a capacitor 180 and three inverter sub-modules 125, 127, 129. In this embodiment, in phase A the inverter sub-module 125 is coupled to motor winding 130a, in phase B the inverter sub-module 127 is coupled to motor winding 130b, and in phase C the inverter sub-module 129 is coupled to motor winding 130c. The motor windings A, B, C (130a, 130b, 130c) that are coupled together at a neutral point (N) 130d. The current into motor winding A 130a flows out motor windings B 130b and C 130c, the current into motor winding B 130b flows out motor windings A 130a and C 130c, and the current into motor winding C 130c flows out motor windings A 130a and B 130b.

Phase currents (i.e., first resultant stator current (I_as) 122, second resultant stator current (I_bs) 123, and third resultant stator current (I_cs) 124) flow through respective stator windings 130a, 130b, and 130c. The phase to neutral voltages across each of the stator windings 130a-130c are respectively designated as $V_{an}$, $V_{bn}$, $V_{cn}$, with the back EMF voltages generated in each of the stator windings 130a-130c respectively shown as the voltages $E_a$, $E_b$, and $E_c$ produced by ideal voltage sources each respectively shown connected in series with stator windings 130a-130c. As is well known, these back EMF voltages $E_a$, $E_b$, and $E_c$ are the voltages induced in the respective stator windings 130a-130c by the rotation of permanent magnet rotor 131. Although not shown, the motor 130 is coupled to a drive shaft.

The full-wave bridge inverter 120 includes a capacitor 180, a first inverter sub-module 125 comprising a dual switch 182/183, 184/185, a second inverter sub-module 127 comprising a dual switch 186/187, 188/189, and a third inverter sub-module 129 comprising a dual switch 190/191, 192/193. As such, full-wave bridge inverter 120 has six solid state switching devices 182, 184, 186, 188, 190, 192 and six diodes 183, 185, 187, 189, 191, 193 to appropriately switch compound voltage ($V_{IN}$) and provide three-phase energization of the stator windings 130a, 130b, 130c of the three-phase AC motor 130.

Although not illustrated, a closed loop motor controller can receive motor command signals and motor operating signals from the motor 130, and generate control signals for controlling the switching of solid state switching devices 182, 184, 186, 188, 190, 192 within the inverter sub-modules 125, 127, 129. By providing appropriate control signals to the individual inverter sub-modules 125, 127, 129, the closed loop motor controller controls switching of solid state switching devices 182, 184, 186, 188, 190, 192 within the inverter sub-modules 125, 127, 129 and thereby control the outputs of the inverter sub-modules 125, 127, 129 that are provided to motor windings 130a, 130b, 130c, respectively. The first resultant stator current (I_as) 122, the second resultant stator current (I_bs) 123, and the third resultant stator current (I_cs) 124 that are generated by the inverter sub-modules 125, 127, 129 of the three-phase inverter module 120 are provided to motor windings 130a, 130b, 130c. The voltages as $V_{an}$, $V_{bn}$, $V_{cn}$, $E_a$, $E_b$, and $E_c$ and the voltage at node N fluctuate over time depending on the open/close state of switches 182, 184, 186, 188, 190, 192 in the inverter sub-modules 125, 127, 129 of the inverter module 120, as will be described below.

Referring again to FIG. 1, the controller 110 uses the three-phase stator currents (Ias, Ibs, Ics) 122-124 generated at motor windings of the motor 130 to control the motor's 130 current/torque/speed/position.

As will be described more fully below, the controller 110 is "sensorless" meaning that it does not utilize speed or position sensors. For instance, as illustrated in FIG. 1, there is no speed/position sensor present at the motor 130, and the angular position of the rotor of the motor 130 or "shaft position" is estimated without using a position sensor (not illustrated). This is known as "sensorless estimation."

Operation of the Motor Controller

In brief, the motor position and speed are estimated by a sensorless estimator module 111 that generates a position error 150 when an estimated position differs from a real position. The position error 150 output drives a position and speed estimator (or "observer") module 112, and its output is consumed by a speed controller 114 and a current regulated vector control 115. Further details regarding the operation of the motor controller 110 will now be described in detail. It is noted that the controller 110 is designed to receive a speed command input 160, and a measured transmission oil temperature 166 information from a transmission control module (TCM) (not shown), or any other inside/outside modules. The TCM reads the oil (transmission fluid) temperature by using its own temperature sensor.

Motor Temperature Estimator Module

The motor temperature estimator module 116 is coupled to the motor current measurement module 127. One implementation of the motor temperature estimator module 116 is described, for example, in U.S. patent application Ser. No. 12/568,002, filed Sep. 28, 2009, entitled "ELECTRIC MOTOR STATOR WINDING TEMPERATURE ESTIMATION" and assigned to the assignee of the present invention, which is incorporated herein by reference in its entirety.

The motor temperature estimator module 116 is designed to receive the oil temperature 166 information and the three-phase stator currents (Ias, Ibs, Ics) 122, and to use this information to generate an estimated motor temperature 174.

As will be described below, the estimated motor temperature 174 is used to adapt/tune a stator winding resistance value that is used at the sensorless estimator module 111 and the current regulated vector control module 115. In particular, the stator winding resistance value is used at a flux observer (not illustrated) of the sensorless estimator module 111, and is also used at the current regulated vector control module 115 to tune PI current controller (not illustrated).

Sensorless Estimator Module

The sensorless estimator module 111 receives switching vector signals 107 generated by the current regulated vector control module 115, and also receives the three-phase stator currents (Ias, Ibs, Ics) 122 measured from the electric motor 130 by the motor current measurement module 127. Based on these inputs, the sensorless estimator module 111 is designed to generate a rotor angular position error signal 150.

One implementation of the sensorless estimator 111 is described in US 2004/0070362, where blocks 36, 40, 42, 44, 46 in FIG. 1 of US 2004/0070362 correspond to the sensorless estimator 111, and where FIG. 4 of US 2004/0070362 describes details of block 44. As described in US 2004/0070362, stator resistance is used (e.g., block 94 of FIG. 4 of US 2004/0070362) as part of the sensorless estimation. However, in accordance with the presently disclosed embodiments and in contrast to US 2004/0070362, stator resistance information is adjusted/scheduled based on (or as a function of) the estimated motor temperature 174. To explain further, stator winding resistance varies as a function of temperature as described in equation (1) as follows:

$$R_s(T) = R_{s25} \times \{1 + k \times (T-25)\} \quad \text{(Equation 1),}$$

where $R_s(T)$ is the stator winding resistance value, T is the stator winding temperature (in Celsius), $R_{s25}$ is the stator winding temperature at 25° C. and k is the material property that determines a rate of the stator winding resistance change according to the temperature. Stator resistance changes about ±40% from its nominal value over −40 C to 120 C oil temperature range. In case of the copper winding k=0.0039. This stator resistance information is then used at a closed loop flux observer module (not illustrated in FIG. 1) implemented in the sensorless estimator 111 to compute the rotor angular position error signal 150.

Thus, in the disclosed embodiments, the motor temperature estimator 116 of the disclosed embodiments can use oil temperature information 166 from a transmission control module (TCM) (not illustrated) to generate an estimated motor temperature 174, and the estimated motor temperature 174 is used to tune or adapt stator winding resistance value at the high-speed, closed-loop flux observer module (not illustrated) that is used in the sensorless estimator module 111.

Current Regulated Vector Control Module

The current regulated vector control module 115 is coupled to the position and speed estimator module 112, the low-pass filter 113, the speed controller module 114, the motor temperature estimator module 116 and the motor current measurement module 127. The current regulated vector control module 115 is designed receive the three-phase stator currents (Ias, Ibs, Ics) 122 from the electric motor 130, a motor torque command signal or commanded torque (Te*) 136, a filtered rotor angular velocity signal 172, and an estimated rotor angular position output 168.

Based on these inputs, the current regulated vector control module 115 generates the switching vector signals (Sa, Sb, Sc) 107. One implementation of the current regulated vector control module 115 is described in US 2004/0070362 where blocks 14, 16, 18, 20, 22, 24, 26, 28, 30 and 32 in FIG. 1 of US 2004/0070362 correspond to the current regulated vector control module 115. Stator resistance is used at the current regulated vector control module 115 to determine current control gains for controllers (e.g., such as a PI controller regulator used to control motor current) implemented at the current regulated vector control module 115.

In accordance with the presently disclosed embodiments, the current regulated vector control module 115 also receives the estimated motor temperature 174, and uses the estimated motor temperature 174 to adapt/tune stator winding resistance information, which is then used to tune a PI current controller (not illustrated) that is used to control the motor current at the current regulated vector control module 115.

Motor Speed Controller Module

The controller 110 also includes a speed controller module 114 that is designed to receive a modified motor speed command 164, and a filtered rotor angular velocity signal 172. Based on these signals 164, 172, the speed controller module 114 generates the motor torque command signal (Te*) 136.

Position and Speed Estimator Module

The position and speed estimator module 112 is coupled to the sensorless estimator module 111. The estimator module 112 receives the oil temperature 166 from the transmission control module (TCM) (not shown). The position and speed estimator module 112 computes an estimated rotor angular position output 168, and an estimated raw rotor angular velocity output 170, based on the rotor angular position error signal 150.

Figure 3A:
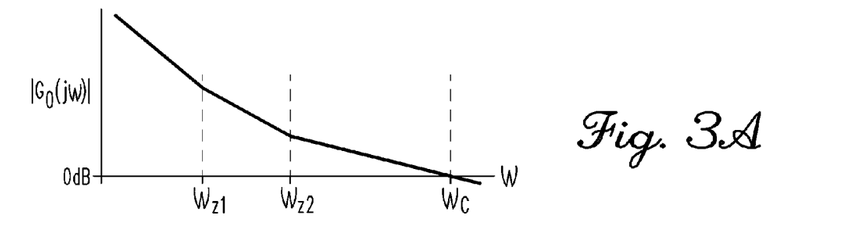
FIG. 3A is a bode plot showing the open loop gain (|Go(jω)|) of the position and speed estimator module at room or higher temperature as a function of frequency.

FIG. 3A is a bode plot showing the open loop gain ($|Go(j\omega)|$) of the position and speed estimator module 112 at room or higher temperature as a function of frequency. The bandwidth of the position and speed estimator module 112 is defined by the zero crossing ($\omega_c$) of the open-loop transfer function. The open loop transfer function ($G_o(j\omega)$) of the position and speed estimator module 112 can be expressed in equation (2) as follows:

$$G_o(s) = \frac{(s + \omega_{z1})(s + \omega_{z2})}{s^3} \cdot \omega_c, \text{ where } s = j\omega \quad \text{(Equation 2)}$$

For the stable system (i.e., when s is close to $j\omega_c$), $G_o(s)$ has to be close to $$G_o(s) \approx \frac{\omega_c}{s}.$$

The open loop gain ($|Go(j\omega)|$) is the magnitude of the open loop transfer function ($G_o(j\omega)$) of the position and speed estimator module 112.

Figure 3B:
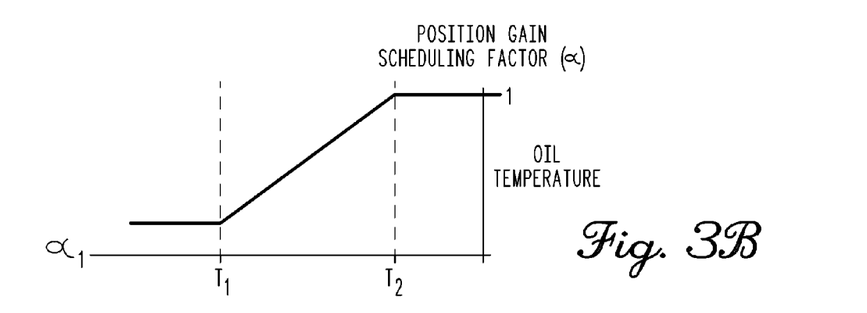
FIG. 3B is a graph showing a position gain scheduling factor (α) as a function of oil temperature in accordance with some embodiments of the present invention.

As described above, because the motor 130 is coupled to an oil pump, as the temperature goes lower, the actual dynamics become slower since the viscosity of the oil increases. In accordance with the disclosed embodiments, the open loop gain ($|Go(j\omega)|$) of the position and speed estimator module 112 can be tuned based on a position gain scheduling factor ($\alpha$) to assure the fast dynamics of the system. This position gain scheduling factor ($\alpha$) varies based on the transmission oil temperature 166. The position and speed estimator module 112 dynamically adjusts the open loop gain ($|Go(j\omega)|$) by adjusting a zero frequency ($w_c$) of the open loop transfer function ($G_o(j\omega)$) of the position and speed estimator module 112;

FIG. 3B is a graph showing a position gain scheduling factor ($\alpha$) as a function of oil temperature in accordance with some embodiments of the present invention. $T_1$ and $T_2$ are temperature set points that are set according to the oil characteristics. The position gain scheduling factor ($\alpha$) is the gain reduction factor at cold temperature, and is determined based on the oil temperature $T_{oil}$ with the following equations (3 through 5);

$$\alpha(T_{oil}) = 1 \text{ if } T_{oil} > T_2 \quad \text{(Equation 3)}$$

$$\alpha(T_{oil}) = \alpha_1 \text{ if } T_{oil} < T_1 \quad \text{(Equation 4)}$$

Otherwise $$\alpha(T_{oil}) = \frac{1 - \alpha_1}{T_2 - T_1} \cdot (T_{oil} - T_1) + \alpha_1. \quad \text{(Equation 5)}$$

Figure 3C:
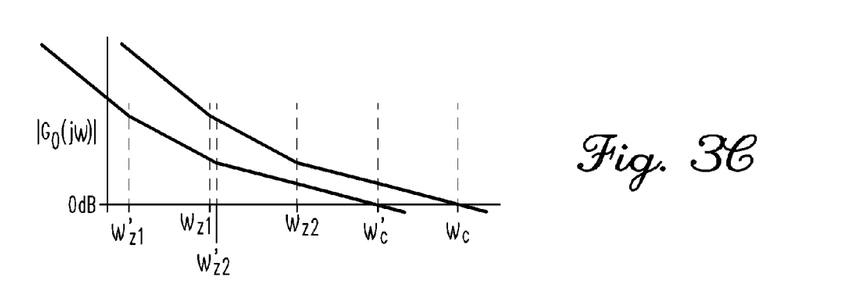
FIG. 3C is a bode plot showing of the open loop gain (|Go(jω)|) of the position and speed estimator module in accordance with some embodiments of the present invention.
Figure 3D:
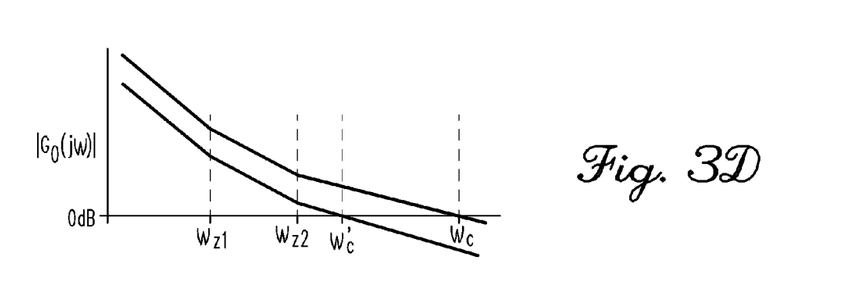
FIG. 3D is a bode plot showing of the open loop gain (|Go(jω)|) of the position and speed estimator module in accordance with some other embodiments of the present invention.

As illustrated in equation (3), the value of the position gain scheduling factor ($\alpha$) is set to one when the measured oil temperature 166 is greater than the second temperature set point ($T_2$). Equation (4) shows that the value of the position gain scheduling factor (α) is set to a constant value (α$_1$) when the measured oil temperature 166 is less than a first temperature set point (T$_1$). As illustrated in equation (5), the value of the position gain scheduling factor (α) is set to a value greater than the constant value (α$_1$) and less than one when the measured oil temperature 166 is greater than the first temperature set point (T$_1$) and is less than a second temperature set point (T$_2$). As illustrated in equation (5), the value of the position gain scheduling factor (α) linearly increases between the constant value (α$_1$) and one when the measured oil temperature 166 increases between the first temperature set point (T$_1$) and the second temperature set point (T$_2$). So, at cold temperature (T$_{oil}$<T$_2$), this factor is gradually reduced as the temperature decreases, and finally limited to α$_1$ below T$_1$. As illustrated in FIG. 3C or 3D, bandwidth (ω$_c$) of the position and speed estimator module 112 is scheduled based on the position gain scheduling factor (α).

FIG. 3C is a bode plot showing of the open loop gain (|Go(jω)|) of the position and speed estimator module 112 in accordance with some embodiments of the present invention. In FIG. 3C, the open loop gain (|Go(jω)|) gets shifted to a lower frequency according to the position gain scheduling factor (α) of FIG. 3B. With respect to FIG. 3C, the relationship between the position gain scheduling factor (α) and frequency can be expressed in equations (6 through 8) as follows:

$$\omega_c' = \alpha(T_{oil}) \times \omega_c \quad \text{(Equation 6)}$$

$$\omega_{z1}' = \alpha(T_{oil}) \times \omega_{z1} \quad \text{(Equation 7)}$$

$$\omega_{z2}' = \alpha(T_{oil}) \times \omega_{z2} \quad \text{(Equation 8)}$$

As illustrated in FIG. 3C, the entire bode plot is shifted to the lower frequency region as the temperature decreases.

FIG. 3D shows an alternative approach to the one used in FIG. 3C. FIG. 3D is a bode plot showing of the open loop gain (|Go(jω)|) of the position and speed estimator module 112 in accordance with some other embodiments of the present invention. As shown in FIG. 3D, the open loop gain (|Go(jω)|) of the position and speed estimator module 112 gets lowered while maintaining the other frequency components except the bandwidth ω$_c$. This can be expressed as follows in equation (9):

$$\omega_c' = \alpha(T_{oil}) \times \omega_c \quad \text{(Equation 9)}$$

In the approach according to FIG. 3D the position gain scheduling factor (α) is only used to lower the cutoff frequency (ω$_c$), and other frequency components remain same.

Thus, as illustrated in FIG. 3C or 3D, the open loop gain (|Go(jω)|) of the position and speed estimator module 112 (that is used to estimate the estimated rotor angular position output 168 and the estimated raw rotor angular velocity output 170) is adjusted or scheduled based on the transmission oil temperature 166. The load of the oil pump varies significantly over the wide oil temperature range. By implementing the gain scheduling techniques shown in either FIG. 3C or FIG. 3D to vary the gain with respect to oil temperature, unwanted noise signals are reduced at cold temperature, which helps improve the stability of the sensorless control and maintain proper speed control.

Low-Pass Filter

During the start up at cold temperatures, a high motor torque is required at lower motor speed range. The effectiveness of the signal-injection method can be limited at low motor operating speeds. At low speed, noise/distortion caused by the inverter voltage error (due to the deadtime effect) and the injection signal (used by the low speed algorithm) can corrupt the estimated speed 170, which tends to limit the estimation bandwidth. As the controls transition from a low speed method to a high speed method, the high speed estimation gets distorted by low speed injection signal. However, at higher speed, the signal to noise ratio becomes greater, and also there is no need to use the low speed algorithm. Thus the estimated speed 170 needs to be filtered for robust control while providing adequate bandwidth to avoid phase lag introduced by the low pass filter 113 at higher motors speed. Moreover, voltage distortion still poses problems during transition to low motor operating speeds. Thus, the raw speed output 170 of the position and speed estimator module 112 can be noisy especially at low speed.

As such, a low-pass filter 113 is coupled to the position and speed estimator module 112 to smooth the raw speed output 170. The low-pass filter 113 filters the estimated raw rotor angular velocity output 170 to generate a filtered rotor angular velocity signal 172 that represents estimated rotor angular velocity (N$_r$). If the bandwidth (ω$_{bw}$) of the low pass filter 113 is too high noise can be amplified. It would be desirable to provide techniques for controlling bandwidth of the low pass filter 113.

Figure 4A:
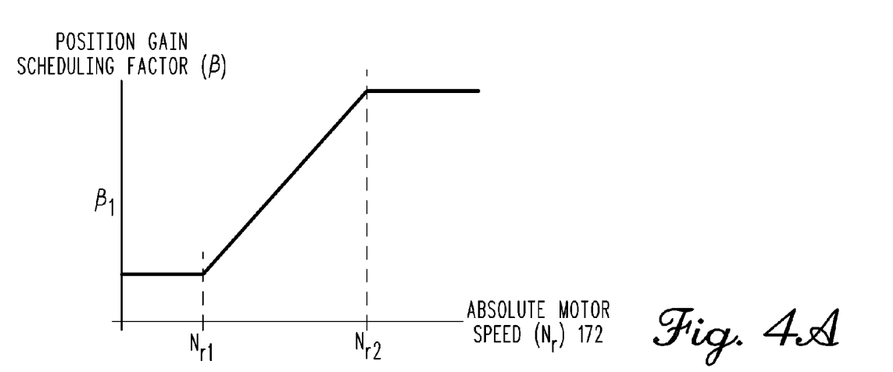
FIG. 4A is a graph in accordance with some embodiments of the present invention showing a speed gain scheduling factor (β) for the low speed operation that varies based on the absolute estimated rotor angular velocity ($N_r$)

According to the disclosed embodiments, the gain and hence bandwidth (ω$_{bw}$) of the low pass filter 113 is scheduled based on the absolute estimated rotor angular velocity (N$_r$). The low-pass filter 113 receives the filtered rotor angular velocity signal 172 via feedback loop 176, and uses it to determine a speed gain scheduling factor (β). The low-pass filter 113 then adjusts the speed gain scheduling factor (β) to continuously adjust the bandwidth (ω$_{bw}$) and gain (|Gf(jω)|) of the low-pass filter 113. FIG. 4A is a graph in accordance with some embodiments of the present invention showing a speed gain scheduling factor (β) for the low speed operation that varies based on the absolute value of the estimated rotor angular velocity (N$_r$). The speed gain scheduling factor (β) for the low-pass filter 113 can be set as a function of the current motor speed. Set points N$_{r1}$ and N$_{r2}$ are set according to the noise level of the inverter 120 at low speed and sensorless algorithm transition band. The signal-to-noise ratio of the inverter noise increases as the motor speed increases. The set point N$_{r2}$ can be set to the speed where the high speed algorithm works, and the set point N$_{r1}$ can be set to the speed where the inverter noise become negligible. The speed gain scheduling factor (β) is determined based on the absolute estimated rotor angular velocity (N$_r$) with the following equations (10 through 12);

$$\beta(N_r) = 1 \text{ if } |N_r| > N_{r2}, \quad \text{(Equation 10)}$$

$$\beta(N_r) = \beta_1 \text{ if } |N_r| < N_{r1}, \text{ and} \quad \text{(Equation 11)}$$

$$\beta(N_r) = \frac{1 - \beta_1}{N_{r2} - N_{r1}} \cdot (|N_r| - N_{r1}) + \beta_1 \text{ otherwise.} \quad \text{(Equation 12)}$$

As illustrated in equation (10), the value of the speed gain scheduling factor (β) is set to one when the absolute estimated rotor angular velocity (N$_r$) is greater than the second set point (N$_{r2}$). Equation (11) shows that the value of the speed gain scheduling factor (β) is set to a constant value (β$_1$) when the absolute estimated rotor angular velocity (N$_r$) is less than a first set point (N$_{r1}$). As illustrated in equation (12), the value of the speed gain scheduling factor (β) is set to a value that linearly increases between the constant value (β$_1$) and one when the absolute estimated rotor angular velocity (N$_r$) is greater than the first set point (N$_{r1}$) and is less than the second set point (N$_{r2}$). (i.e., is between the first set point (N$_{r1}$) and the second set point ($N_{r2}$)). With this speed gain scheduling factor (β), the bandwidth ($\omega_{bw}$) of the low pass filter 113 is adjusted as the following equation (13).

$$\omega_{bw}'(N_r) = \beta(N_r) \times \omega_{bw} \quad \text{(Equation 13)}$$

Figure 4B:
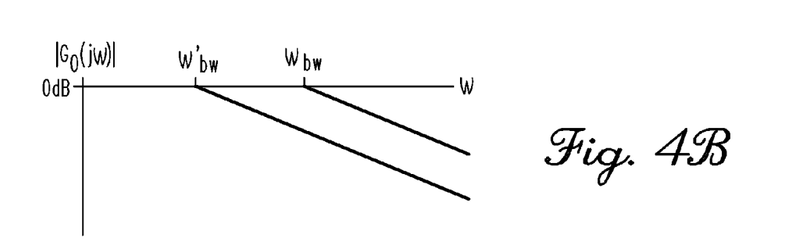
FIG. 4B is a bode plot showing the magnitude of a transfer function Gf(jω) of the low-pass filter in the frequency domain in accordance with some embodiments of the present invention.

FIG. 4B is a bode plot showing the magnitude of a transfer function Gf(jω) of the low-pass filter 113 in the frequency domain in accordance with some embodiments of the present invention. The transfer function of the low-pass filter 113 in the frequency domain is represented by Gf(jω). When the low speed algorithm is mainly used at the low speed, the speed gain scheduling factor (β) can be used to reduce the bandwidth of the low-pass filter 113. When the high speed algorithm is used at high speed where the signal to noise ratio is big enough, the speed gain scheduling factor (β) can be used to increase the bandwidth ($\omega_{bw}$) of the low pass filter 113 to ensure better dynamic performance.

Thus, based on estimated motor speed, a low pass filter and feedback mechanism of the disclosed embodiments can vary the bandwidth of the low-pass filter 113.

Slew Rate Limiter Module

The slew rate limiter module 117 receives a motor speed command 160 generated by a higher level controller (not shown). Acceleration or deceleration is the rate of change of speed with respect to time. Thus, when a current motor speed command 160 is greater than a previous motor speed command 160 (i.e., from a prior calculation), it is assumed that the motor is accelerating. By contrast, when the current motor speed command 160 is less than the previous motor speed command 160 (i.e., from a prior calculation), it is assumed that the motor is decelerating.

The rate of change of acceleration or deceleration with respect to time is called "jerk." A sudden change of the motor speed command 160 normally creates a high "jerk" and induces a fast dynamic change of motor torque command 136 due to the back pressure of the oil pump. This will cause the mechanical system to operate fast beyond the speed bandwidth of the sensorless system, which lowers the stability of the overall oil pump system at low speed.

In the description that follows, the actual motor speed will be designated using the symbol Nr, the motor speed command 160 that is input to the slew rate limiter module 117 will be designated using the symbol Nr, and the modified motor speed command 164 that is output by the slew rate limiter module 117 (and feedback to the slew rate limiter module 117**) will be designated using the symbol Nr*.

Figure 6:
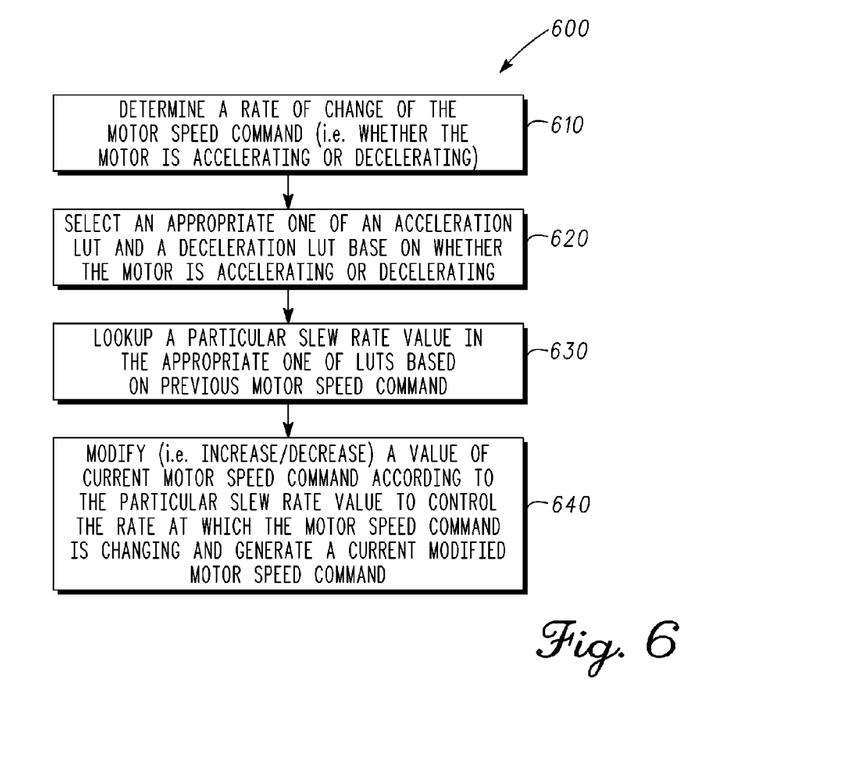
FIG. 6 is a flowchart showing a method for modifying a motor speed command to reduce jerk in accordance with some embodiments of the present invention.

FIG. 6 is a flowchart showing a method 600 performed at the slew rate limiter module 117 for modifying a motor speed command 160 to reduce jerk when the motor 130 is operating in its low speed region in accordance with some embodiments of the present invention.

At step 610, the slew rate limiter module 117 can determine a rate of change of the motor speed command 160 (i.e., whether the motor is accelerating or decelerating). For example, the slew rate limiter module 117 determines that an acceleration condition is occurring if a current value of the speed command input ($N_r^{}$) 160 is greater than the previous value of the speed command input ($N_r^{}$) 160 (i.e., that was calculated at the previous step). By contrast, the slew rate limiter module 117 determines that a deceleration condition is occurring if a current value of the speed command input ($N_r^{}$) 160 is less than the previous value of the speed command input ($N_r^{}$) 160 (i.e., that was calculated at the previous step).

Based on whether the motor is accelerating or decelerating, at step 620, the slew rate limiter module 117 can select an appropriate one of an acceleration LUT and a deceleration LUT. Each LUT provides a slew rate values as a function of the motor speed command 164 at the previous step. An example of information stored in each LUT is illustrated in graphical form in FIG. 5A, wherein the x-axis of FIG. 5A is the output 164 of the slew rate limiter module 117.

Figure 5A:
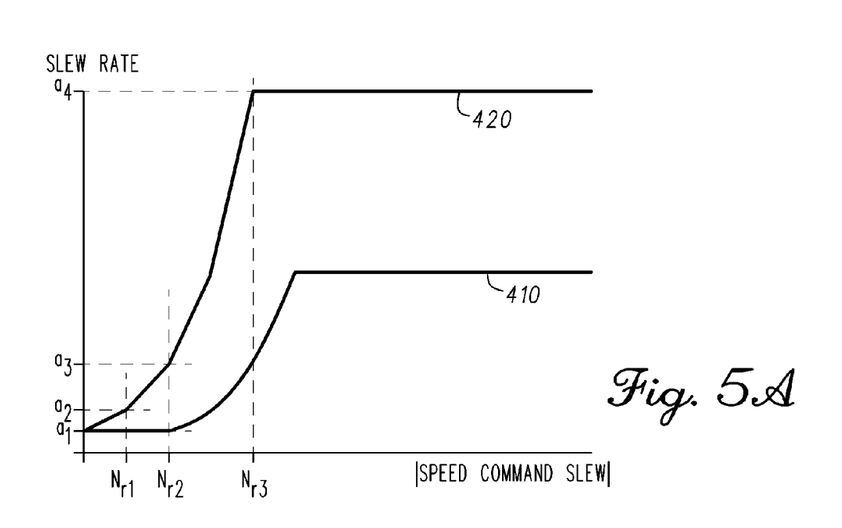
FIG. 5A is a graph showing slew rate of the speed command input versus speed command slew in accordance with some embodiments of the present invention.

FIG. 5A is a graph of a curve showing slew rate to be applied to a motor speed command 160 by the slew rate limiter module 117 versus motor speed (Nr) in accordance with some embodiments of the present invention. In this example, three values of motor speed Nr1, Nr2, Nr3 are shown. Motor speeds (Nr) which are less than Nr3 are considered to be within a "low" motor speed region. The dashed line 410 is a curve for setting slew rate of the slew rate limiter module 117 during a deceleration situation. The solid line 420 is a curve for setting slew rate of the slew rate limiter module 117 during an acceleration situation. The slope of each curve 410, 420 represent the rate of change of the slew rate. For example, with respect to the solid line 420, between a1 and a4, the slope of the curve 420 gradually increases, and above a4 the slope of the curve 420 is zero. This allows a variable slew rate to be applied to the motor speed command 160 by the slew rate limiter module 117 (that varies based on a current value of the actual motor speed (Nr)) to generate the modified motor speed command 164. Curves 410, 420 show that in a low speed operating region of motor speed (Nr), the rate of change of the slew rate that is applied to the motor speed command 160 gradually increases as motor speed (Nr) increases.

For instance, at low values (Nr1) of motor speed (Nr), the rate of change of the slew rate that is applied to the motor speed command 160 is lower than the rate of change of the slew rate that is applied to the motor speed command 160 at higher values (Nr2) of motor speed (Nr). In other words, when the motor is operating in the low speed operating region, the rate of change of slew rate (or slope of the curve) increases as motor speed (Nr) increases. This is because at lower motor speeds, the proposed speed command can have lower rate of acceleration (or deceleration) than at higher motor speeds. It is noted that in this specific example of FIG. 5A, a higher maximum slew rate is permitted in an acceleration situation (line 420) versus a deceleration situation (line 410). However, this example is non-limiting and depending on the implementation and the application requirements, the deceleration curve 410 and acceleration curve 420 can be set either the same or differently.

At step 630, the slew rate limiter module 117 inputs the motor speed command 164 (ior 176) at the previous step (Nr*) into the appropriate one of the LUTs to generate a particular slew rate value ($a_n$).

At step 640, the slew rate limiter module 117 can then modify (i.e., increase/decrease) a value of its current motor speed command 160 according to the particular slew rate value ($a_n$) to generate its current modified motor speed command 164. By varying the slew-rate of the motor speed command 160 based on the feedback regarding a previous value of a modified motor speed command 164 (that is fedback to the slew rate limiter module 117 via a feedback loop 176), the slew rate limiter module 117 can control or limit the rate at which the motor speed command 160 is changing. As will be described below with reference to FIG. 5B, this can reduce the amount of jerk when the motor is operating in its low speed region.

For instance, when it is determined that an acceleration condition is occurring at step 610 and that the acceleration LUT is to be used (at step 620), the slew rate limiter module 117 inputs the absolute value of the previous modified motor speed command 164 into the acceleration LUT to generate a particular slew rate value ($a_n$). For example, if the previous motor speed command (Nr*) is equal to Nr1, then the slew rate is a2, and the slew rate limiter module 117 will increase the speed command ($N_r$) 160** at the rate of a2.

When it is determined that a deceleration condition is occurring at step 610 and that the deceleration LUT is to be used (at step 620), the slew rate limiter module 117 inputs the the absolute value of the previous modified motor speed command 164 into the deceleration LUT to generate a particular slew rate value ($a_n$). For example, if the previous motor speed command (Nr*) is equal to Nr2, then the slew rate is a1, and the slew rate limiter module 117 will decrease the speed command ($N_r$) 160** at the rate of a1.

Figure 5B:
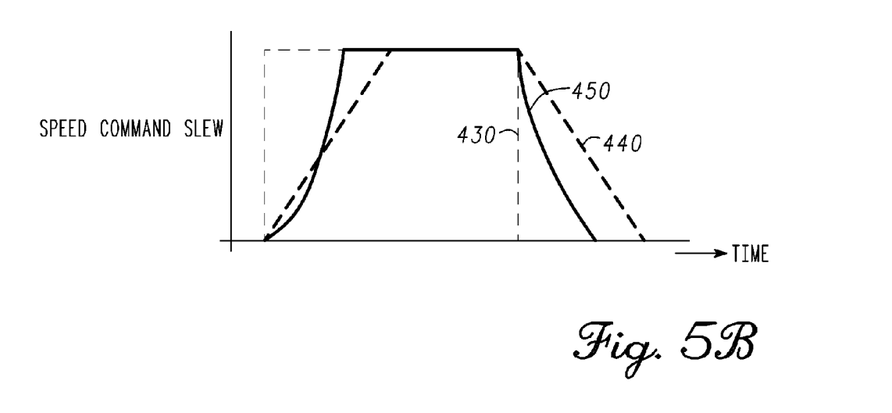
FIG. 5B is a graph showing speed command slew versus time in accordance with some embodiments of the present invention.

FIG. 5B is a graph showing waveforms 430, 440, 450 of three different motor speed commands versus time in accordance with some embodiments of the present invention. In FIG. 5B, the dotted line 430 is a waveform that represents the original or "raw" motor speed command 160. By contrast, the dashed line 440 is a waveform that represents a modified motor speed command 164 that is output by the slew rate limiter module 117 when the slew rate limiter module 117 applies a constant slew-rate (e.g., $a_4$) to the motor speed command 160. This waveform represents a situation in which there is a constant acceleration (or deceleration). In the constant acceleration scenario, it is necessary to increase the acceleration (or deceleration) value if the response time is to be reduced. If the acceleration (or deceleration) value is set to too high value to achieve the fast response, then it may induce the mechanical system to move beyond the bandwidth of the sensorless control, which can cause the loss of the sensorless control.

The solid line 450 is a waveform that represents a modified motor speed command 164 that is output by the slew rate limiter module 117 when the slew rate limiter module 117 applies a variable slew-rate to the motor speed command 160 in accordance with FIG. 5A. By limiting the slew rate in accordance with FIG. 5A, the waveform of the original motor speed command 160 (represented by dotted line 430 in FIG. 5B) can be modified to produce the modified motor speed command 164 having a waveform like that shown by the solid line 450.

Notably, as shown in FIG. 5B, compared with the dashed line 440, the solid line 450 can have slower acceleration (or deceleration) at low speed to avoid the instability problem, and also achieve the faster response time to reach the original speed command level by allowing high acceleration (or deceleration) at high speed.

Those of skill would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A motor drive system, comprising:
an oil pump;
a pulse width modulated (PWM) inverter module designed to receive switching vector signals and designed to generate three-phase voltage signals;
an electric motor designed to drive the oil pump, the electric motor comprising motor windings each being coupled to the PWM inverter module to receive the three-phase voltage signals that drive a rotor of the electric motor at varying angular velocities, the electric motor being designed to generate three-phase stator currents at the motor windings;
a motor current measurement module, coupled to the motor windings of the electric motor, and designed to measure the three-phase stator currents;
a transmission control module designed to generate a measured oil temperature; and
a controller, coupled to the PWM inverter module, and designed to generate the switching vector signals that drive the PWM inverter module, the controller comprising:
a motor temperature estimator module designed to receive the measured oil temperature and the measured three-phase stator currents, and to generate an estimated motor temperature; and
a position and speed estimator module designed to generate an estimated rotor angular position output;
a low-pass filter designed to generate a filtered rotor angular velocity signal;
a speed controller module designed to generate a motor torque command signal; and
a current regulated vector control module designed to generate the switching vector signals based on the motor torque command signal, the three-phase stator currents measured from the electric motor, the filtered rotor angular velocity signal, the estimated motor temperature and the estimated rotor angular position output.

2. A motor control system according to claim 1, wherein the controller comprises:
a sensorless estimator module designed to receive the estimated motor temperature and to regularly compute a stator winding resistance value that varies based on the estimated motor temperature, and wherein the sensorless estimator module comprises a closed-loop flux observer module having a stator winding resistance value parameter that varies based on the current stator winding resistance value, wherein the sensorless estimator module generates a rotor angular position error signal 150 that varies based on the stator winding resistance value.

3. A motor control system according to claim 2, wherein the stator winding resistance value is adjusted as a function of the estimated motor temperature.

4. A motor control system according to claim 2, wherein the position and speed estimator module is designed to receive the measured oil temperature and to compute: an estimated rotor angular position output and an estimated raw rotor angular velocity output based on the rotor angular position error signal, and wherein the position and speed estimator module has an open loop transfer function having an open loop gain, and wherein the position and speed estimator module is designed to dynamically adjust the open loop gain based on the measured oil temperature.

5. A motor control system according to claim 4, wherein the position and speed estimator module is designed to dynamically adjust the open loop gain by adjusting a zero frequency crossing of the open loop gain based on a position gain scheduling factor that varies in accordance with the measured oil temperature.

6. A motor control system according to claim 4, wherein the open loop gain is used to compute the estimated rotor angular position output and the estimated raw rotor angular velocity output.

7. A motor control system according to claim 4, wherein the position gain scheduling factor increases as the measured oil temperature increases and decreases as the measured oil temperature decreases.

8. A motor control system according to claim 4, wherein the value of the position gain scheduling factor is set to a constant value when the measured oil temperature is less than a first temperature set point, wherein the value of the position gain scheduling factor is set to one when the measured oil temperature is greater than a second temperature set point, and wherein the value of the position gain scheduling factor linearly increases between the constant value and one when the measured oil temperature increases between the first temperature set point and the second temperature set point.

9. A motor control system according to claim 4, wherein the zero frequency crossing represents bandwidth of the position and speed estimator module, and wherein the zero frequency crossing and bandwidth of the position and speed estimator module increases as the measured oil temperature increases, and wherein the zero frequency crossing and bandwidth of the position and speed estimator module decreases as the measured oil temperature decreases.

10. A motor control system according to claim 4, wherein the cutoff frequency and the open loop gain of the position and speed estimator module are decreased as the measured oil temperature decreases while other frequency components the open loop gain remain the same.

11. A motor control system according to claim 4, wherein the low-pass filter has a filter transfer function and is coupled to the position and speed estimator module, wherein the low-pass filter is designed to: filter the estimated raw rotor angular velocity output to generate a filtered rotor angular velocity signal that represents absolute estimated rotor angular velocity, receive the filtered rotor angular velocity signal received via a first feedback loop, and continuously adjust bandwidth of the low-pass filter based on the absolute estimated rotor angular velocity.

12. A motor control system according to claim 11, wherein the low-pass filter is designed to: continuously adjust bandwidth of the low-pass filter by varying a speed gain scheduling factor, wherein the speed gain scheduling factor varies based on the absolute estimated rotor angular velocity.

13. A motor control system according to claim 12, wherein adjusting bandwidth of the low-pass filter varies a filtering gain of the filter transfer function.

14. A motor control system according to claim 12, wherein the value of the speed gain scheduling factor is set to a constant value when the absolute estimated rotor angular velocity is less than a first set point, wherein the value of the speed gain scheduling factor is set to one when the absolute estimated rotor angular velocity is greater than a second set point and wherein the value of the speed gain scheduling factor is set to a value that linearly increases between the constant value and one when the absolute estimated rotor angular velocity is between the first set point and the second set point.

15. A motor control system according to claim 11, wherein the controller further comprises:
   a slew rate limiter module, designed to:
      receive a motor speed command input;
      determine a slew rate of the motor speed command input; and
      generate a modified motor speed command signal by varying a slew-rate applied to the motor speed command input based on feedback regarding the modified motor speed command signal provided via a second feedback loop.

16. A motor control system according to claim 15, wherein the slew rate limiter module is designed to:
   determine a rate of change of the motor speed command input, wherein the slew rate limiter module determines that an acceleration condition is occurring if a current value of the speed command input is greater than a previous value of the speed command input, and wherein the slew rate limiter module determines that a deceleration condition is occurring if the current value of the speed command input is less than the previous value of the speed command input;
   select an appropriate one of an acceleration look-up table (LUT) when an acceleration condition is occurring and a deceleration LUT when a deceleration condition is occurring, wherein the acceleration LUT and the deceleration LUT each provide slew rate values as a function of the previous speed command;
   input current actual motor speed into the appropriate one of the LUTs that was selected to generate a particular slew rate value;
   modify a value of its current motor speed command input according to the particular slew rate value to generate its current modified motor speed command signal and limit the rate at which the motor speed command input is changing.

17. A motor control system according to claim 16, when an acceleration condition is occurring and the acceleration LUT is selected, wherein the slew rate limiter module is designed to: increase the speed command at a particular slew rate value generated by the acceleration LUT.

18. A motor control system according to claim 16, when a deceleration condition is occurring and the deceleration LUT is selected, wherein the slew rate limiter module is designed to: decrease the speed command at a particular slew rate value generated by the deceleration LUT.

19. A motor control system according to claim 15, wherein the speed controller module is designed to generate the motor torque command signal based on the modified motor speed command signal and the filtered rotor angular velocity signal.

20. A motor control system according to claim 19, wherein the current regulated vector control module comprises a proportional-integral (PI) current controller, wherein the current regulated vector control module is designed to compute a stator winding resistance value based on the estimated motor temperature and to use the stator winding resistance value to adjust a gain of the PI current controller, wherein the stator winding resistance value varies based on the estimated motor temperature.

* * * * *